United States Patent
Chuang (10) Patent No.: US 7,699,392 B2
(45) Date of Patent: Apr. 20, 2010

(54) BICYCLE SADDLE

(76) Inventor: Louis Chuang, 8th Floor-4, No. 20, Ta Lon Road, Taichung (TW)

( * ) Notice: Subject to any disclaimer, the term of this patent is extended or adjusted under 35 U.S.C. 154(b) by 0 days.

(21) Appl. No.: 11/858,208

(22) Filed: Sep. 20, 2007

(65) Prior Publication Data

US 2008/0007099 A1 Jan. 10, 2008

Related U.S. Application Data

(63) Continuation-in-part of application No. 11/307,240, filed on Jan. 27, 2006, now abandoned.

(51) Int. Cl.
B62J 1/18 (2006.01)
(52) U.S. Cl. .................. 297/202; 297/214
(58) Field of Classification Search .......... 297/195.1, 297/199, 200, 202, 214, 219.11
See application file for complete search history.

(56) References Cited

U.S. PATENT DOCUMENTS

| | | | |
|---|---|---|---|
| 532,444 A * | 1/1895 | Christy | 297/202 |
| 574,503 A * | 1/1897 | Van Meter | 297/200 |
| 594,316 A | 11/1897 | Basch | 297/202 |
| 629,956 A | 8/1899 | Craig | 297/201 |
| 630,911 A | 8/1899 | Moore | 297/202 |
| 649,875 A | 3/1902 | Meighan | 297/201 |
| 823,916 A | 6/1906 | Brooks et al. | 297/207 |
| 3,243,231 A | 3/1966 | Duffy | 297/202 |
| 3,997,214 A | 12/1976 | Jacobs | 297/214 |
| 4,063,775 A | 12/1977 | Mesinger | 297/201 |
| 4,098,537 A | 7/1978 | Jacobs | 297/215.16 |
| 4,429,915 A | 2/1984 | Flager | 297/199 |
| 4,512,608 A | 4/1985 | Erani | 297/201 |
| 4,815,361 A | 3/1989 | Chiarella | 297/214 |
| 4,842,332 A | 6/1989 | Conner et al. | 297/214 |
| 4,877,286 A | 10/1989 | Hobson et al. | 297/195 |
| 5,147,685 A | 9/1992 | Hanson | 428/189 |
| 5,165,752 A | 11/1992 | Terry | 297/214 |
| 5,203,607 A * | 4/1993 | Landi | 297/214 |

(Continued)

FOREIGN PATENT DOCUMENTS

EP 1394025 * 3/2004

OTHER PUBLICATIONS

European Patent Publication No. EP 1394025 A1, Mar. 3, 2004, 14 pages.

(Continued)

*Primary Examiner*—Peter R. Brown
(74) *Attorney, Agent, or Firm*—Alan Kamrath; Kamrath & Associates PA (57) ABSTRACT

A bicycle saddle includes a frame and a padding placed over the frame. The padding includes a leading edge, a trailing edge and a recessed supporting surface defined therein for receiving an elastic element. The elastic element includes leading and trailing edge portions for receiving the leading and trailing edges of the padding respectively. The elastic element further includes two side edges extending longitudinally between the leading and trailing edge portions exposed from the recessed supporting surface so that when the bicycle saddle is subject to a force of weight transmitted from a rider, the elastic element can extend transversely to the longitudinal direction between leading and trailing edge portions thereof without confinement.

21 Claims, 14 Drawing Sheets

U.S. PATENT DOCUMENTS

| | | | |
|---|---|---|---|
| 5,286,082 A | 2/1994 | Hanson | 297/201 |
| 5,330,249 A * | 7/1994 | Weber et al. | 297/214 |
| 5,348,369 A * | 9/1994 | Yu | 297/214 |
| 5,387,024 A | 2/1995 | Bigolin | 297/202 |
| 5,524,961 A * | 6/1996 | Howard | 297/199 |
| 5,676,420 A | 10/1997 | Kuipers et al. | 297/204 |
| 5,823,618 A | 10/1998 | Fox et al. | 297/201 X |
| 5,904,396 A * | 5/1999 | Yates | 297/214 |
| 5,911,475 A | 6/1999 | Nakahara | 297/219.11 |
| 5,921,624 A | 7/1999 | Wu | 297/215.14 |
| 6,106,059 A | 8/2000 | Minkow et al. | 297/202 |
| 6,149,230 A | 11/2000 | Bontrager | 297/202 |
| 6,176,546 B1 | 1/2001 | Andrews | 297/195.1 |
| 6,402,236 B1 | 6/2002 | Yates | 297/201 |
| 6,450,572 B1 | 9/2002 | Kuipers | 297/202 X |
| 6,666,507 B1 | 12/2003 | Ringgard | 297/195.1 |
| 6,739,656 B2 | 5/2004 | Yu | 297/215.16 |
| 6,752,453 B1 | 6/2004 | Yapp | 297/215.14 |
| 6,860,551 B1 * | 3/2005 | Chi | 297/200 |
| 6,871,907 B2 * | 3/2005 | Morita et al. | 297/195.1 |
| 6,886,887 B2 | 5/2005 | Yu | 297/202 X |
| 7,025,417 B2 * | 4/2006 | Cohen | 297/195.1 |
| 7,055,900 B2 | 6/2006 | Losio et al. | 297/195.1 |
| 7,178,869 B2 | 2/2007 | Ljubich | 297/201 |
| 2002/0096917 A1 | 7/2002 | Turudich | 297/202 |
| 2004/0004375 A1 | 1/2004 | Garland et al. | 297/204 |
| 2004/0056519 A1 | 3/2004 | Kastarlak | 297/195.1 |
| 2006/0071516 A1 | 4/2006 | Pandozy | 297/202 X |
| 2007/0108808 A1 | 5/2007 | Chuang | 297/195.1 |
| 2007/0176472 A1 | 8/2007 | Chuang | 297/202 |

OTHER PUBLICATIONS

Chinese Patent Publication No. CN 1521079Y, Aug. 18, 2004, 10 pages.
Chinese Patent Publication No. CN 1629030 A, Jun. 22, 2005, 13 pages.
Chinese Patent Publication No. CN 2262520 Y, Sep. 17, 1997, 06 pages.
Chinese Patent Publication No. CN 2499308 Y, Jul. 10, 2002, 09 pages.
Chinese Patent Publication No. CN 2523668Y, Dec. 4, 2002, 15 pages.
Japanese Utility Model Publication No. JP 3012678 U, Jun. 20, 1995, 08 pages.
Japanese Utility Model Publication No. JP 3112830 U, Aug. 25, 2005, 09 pages.
Japanese Patent Publication No. JP 57198179 A, Dec. 4, 1982, 04 pages.

* cited by examiner

BICYCLE SADDLE

CROSS REFERENCE

The present application is a continuation-in-part, application of U.S. patent application Ser. No. 11/307,240, filed on Jan. 27, 2006, now abandoned, of which the entire disclosure is incorporated herein.

BACKGROUND OF THE INVENTION

1. Field of the Invention

The present invention relates to a bicycle saddle.

2. Description of the Related Art

Modern bicycle saddles preferably include a padding comprised of a first resilient section and a second resilient section, with the first resilient section being softer than the second resilient section such that the first resilient section provides more cushioning effect than the second resilient section. Furthermore, the first resilient section primarily supports the external genital of a rider and thereby reducing the pressure placed on the perineum. Examples of such bicycle saddles are disclosed in U.S. Pat. No. 5,165,752 to Terry, U.S. Pat. No. 5,387,024 to Bigolin and U.S. Pat. No. 6,149,230 to Bontrager.

However, a problem with these modem saddle designs is the expandability of the first pad is limited by the fact that the second resilient section completely surrounds the edge of the first resilient section. Furthermore, each of Terry, Bigolin and Bontrager discloses a seat cover applied over the padding. The seat cover can also limit the expandability of the first pad, thereby reducing the buffering effect of the first resilient section.

The present invention is, therefore, intended to obviate or at least alleviate the problems encountered in the prior art.

SUMMARY OF THE INVENTION

A bicycle saddle includes a frame and a padding placed over the frame. The padding includes a leading edge, a trailing edge and a recessed supporting surface defined therein for receiving an elastic element. The elastic element includes leading and trailing edge portions for receiving the leading and trailing edges of the padding respectively. The elastic element further includes two side edges extending longitudinally between the leading and trailing edge portions exposed from the recessed supporting surface so that when the bicycle saddle is subject to a force of weight transmitted from a rider, the elastic element can extend transversely to the longitudinal direction between leading and trailing edge portions thereof without confinement.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
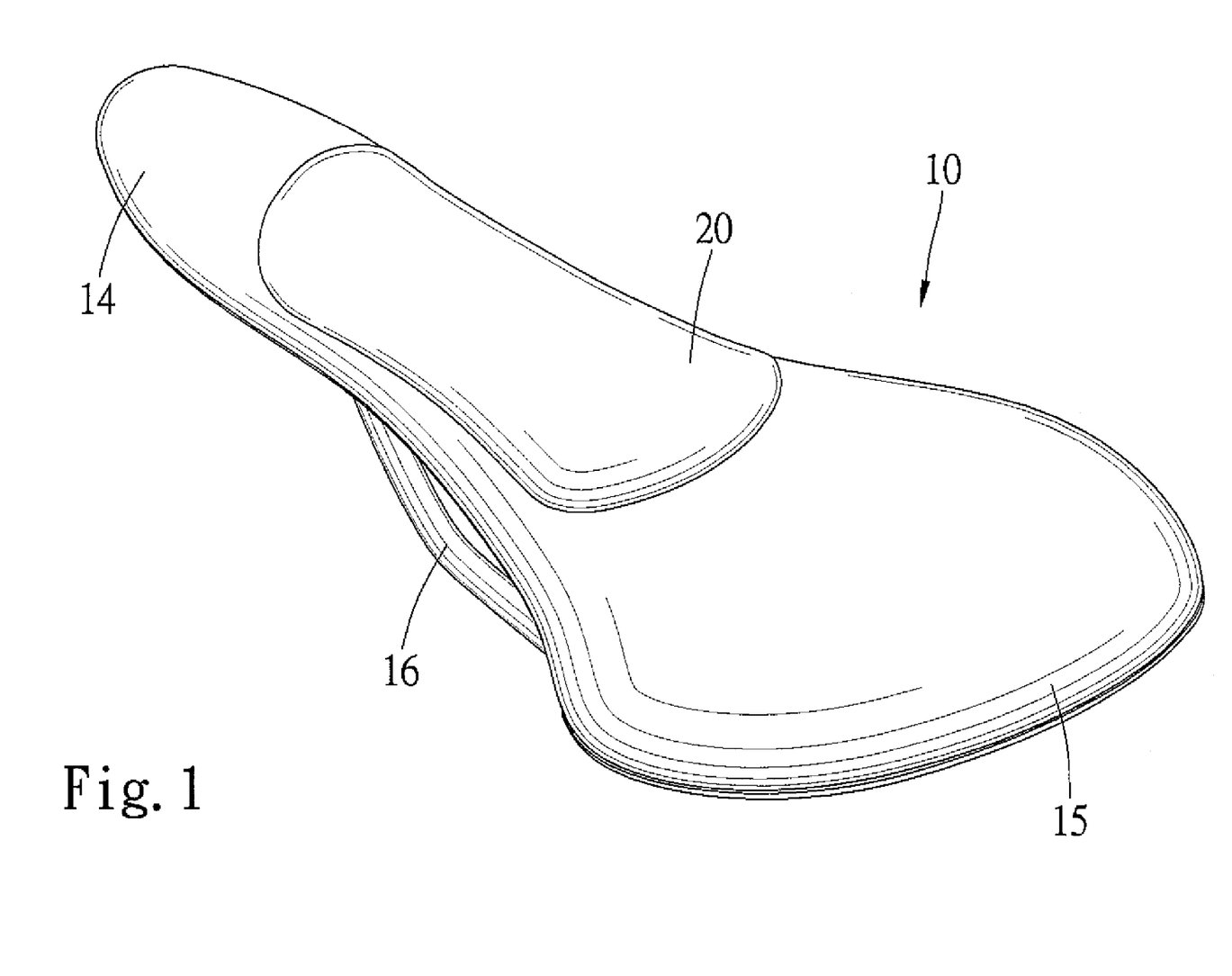
FIG. 1 is a perspective view of a bicycle saddle in accordance with a first embodiment of the present invention.
Figure 2:
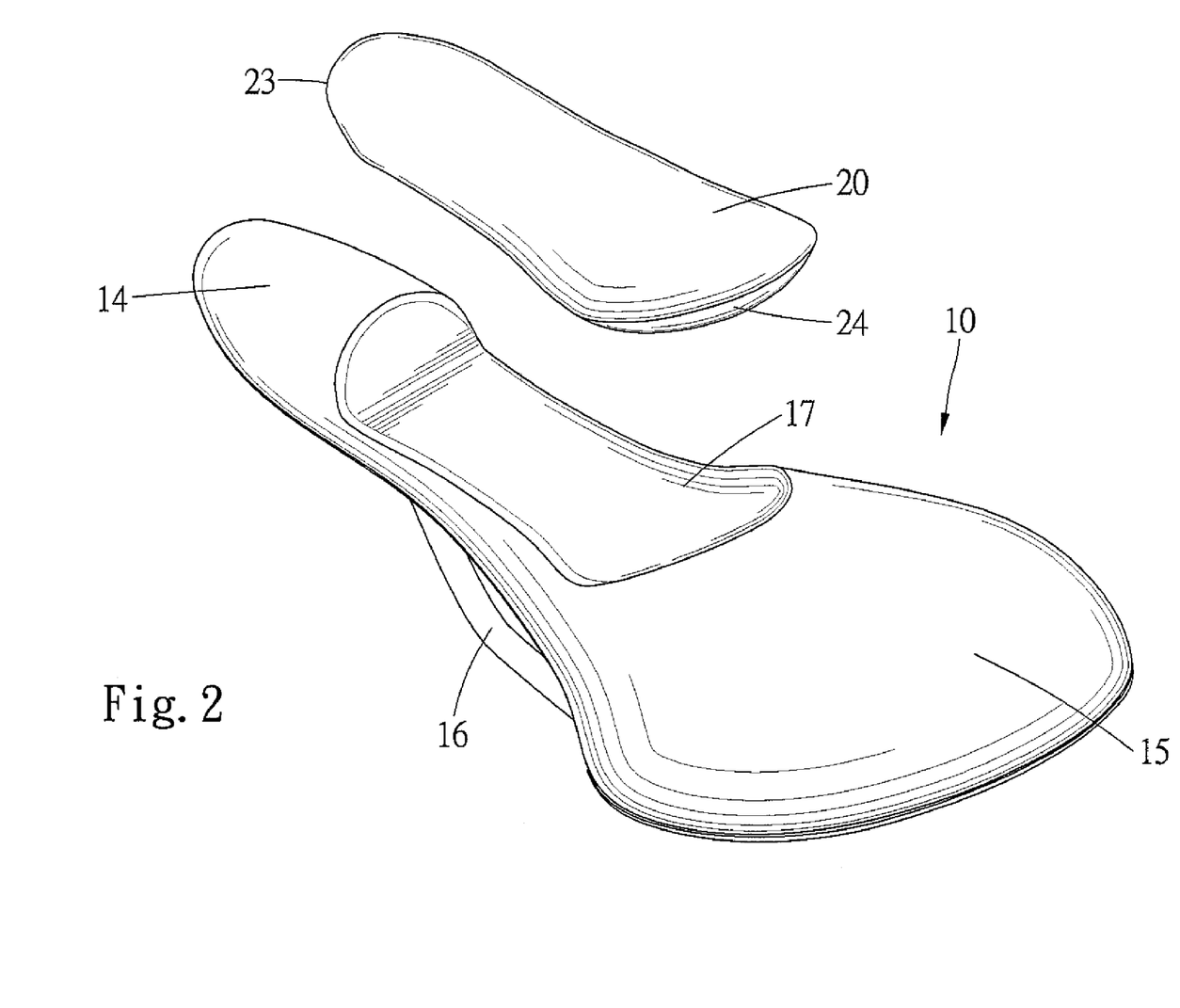
FIG. 2 is an exploded perspective view of the bicycle saddle shown in FIG. 1.
Figure 3:
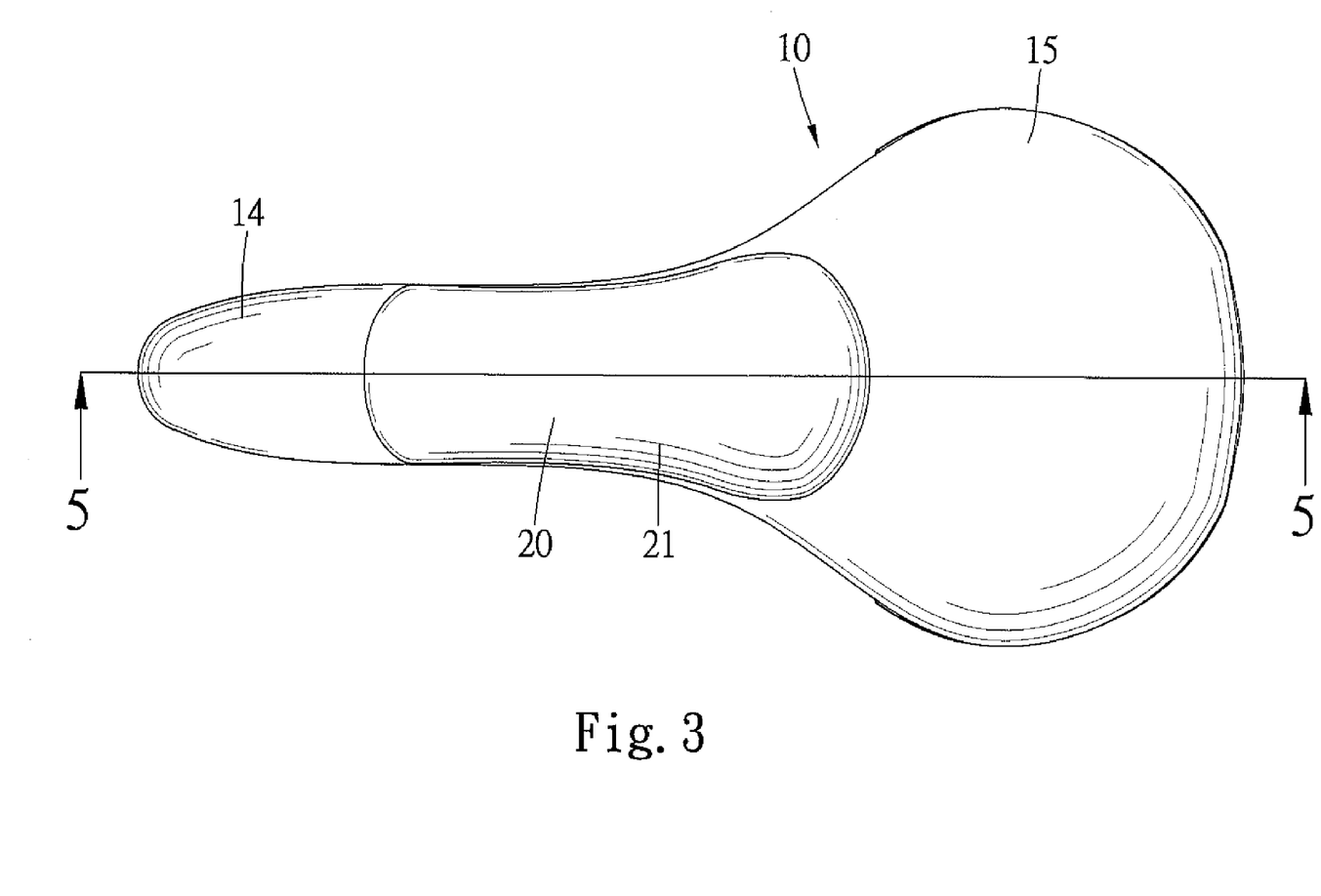
FIG. 3 is a top view of the bicycle saddle shown in FIG. 1.
Figure 5:
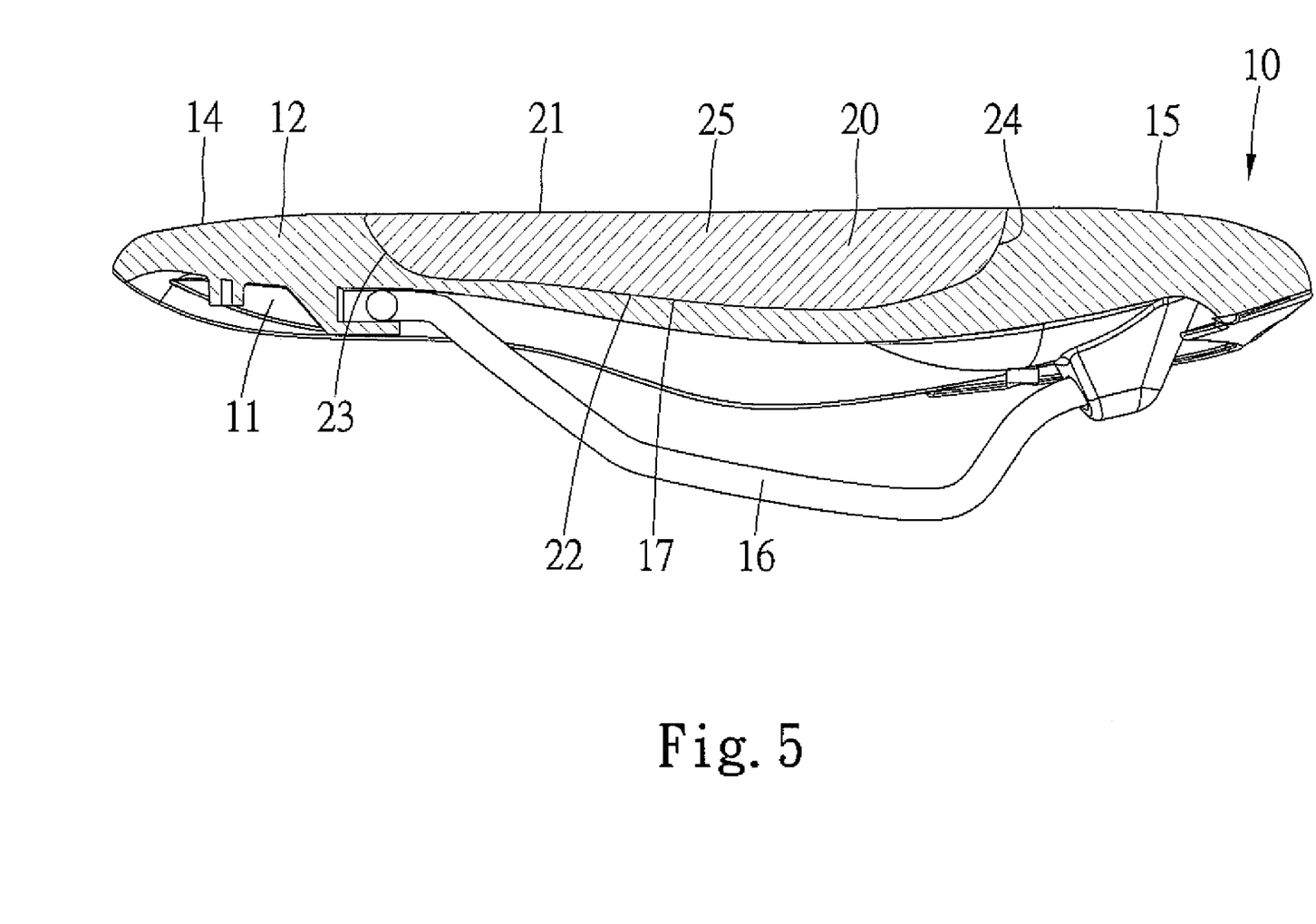
FIG. 5 is a cross-sectional view taken along line 5-5 of FIG. 3.

Referring to FIGS. 1 through 3 in conjunction with FIG. 5, a bicycle saddle 10 in accordance with a first embodiment of the present invention is substantially wedge-shaped and includes a narrow front portion 14 and a flared rear portion 15. The narrow front portion 14 becomes progressively narrower towards its front end. The bicycle saddle 10 is comprised of a frame 11, a padding 12, an elastic element 20 and a suspension rail 16.

The frame 11 is also substantially wedge-shaped and has substantially the same dimension as the bicycle saddle 10.

The padding 12 is made of a resilient material and is placed over the frame 11 so as to define a sitting surface having a leading edge and a trailing edge, a height and a recessed support surface 17 disposed intermediate the leading and trailing edges. The recessed support surface 17 includes a height lower than that of the sitting surface and is adapted to receive the elastic element 20. The elastic element 20 is slidably installed on the recessed support surface 17.

The elastic element 20 has a depth and is made of a resilient material that is softer than the padding 12 so as to provide more cushioning effect. The elastic element 20 has a first surface 21 providing a part of the sitting surface that the rider sits on. The elastic element 20 further includes a second surface 22 adapted to be securely received by the recessed support surface 17. In addition, the elastic element 20 includes a leading edge portion 23, a trailing edge portion 24 and two side edges 25 extending longitudinally therebetween. The leading and trailing edge portions 23, 24 conform to the extreme forward end and extreme rear end of the recessed support surface 17, respectively, and the side edges 25 are exposed from the recessed supporting surface 17.

Figure 4:
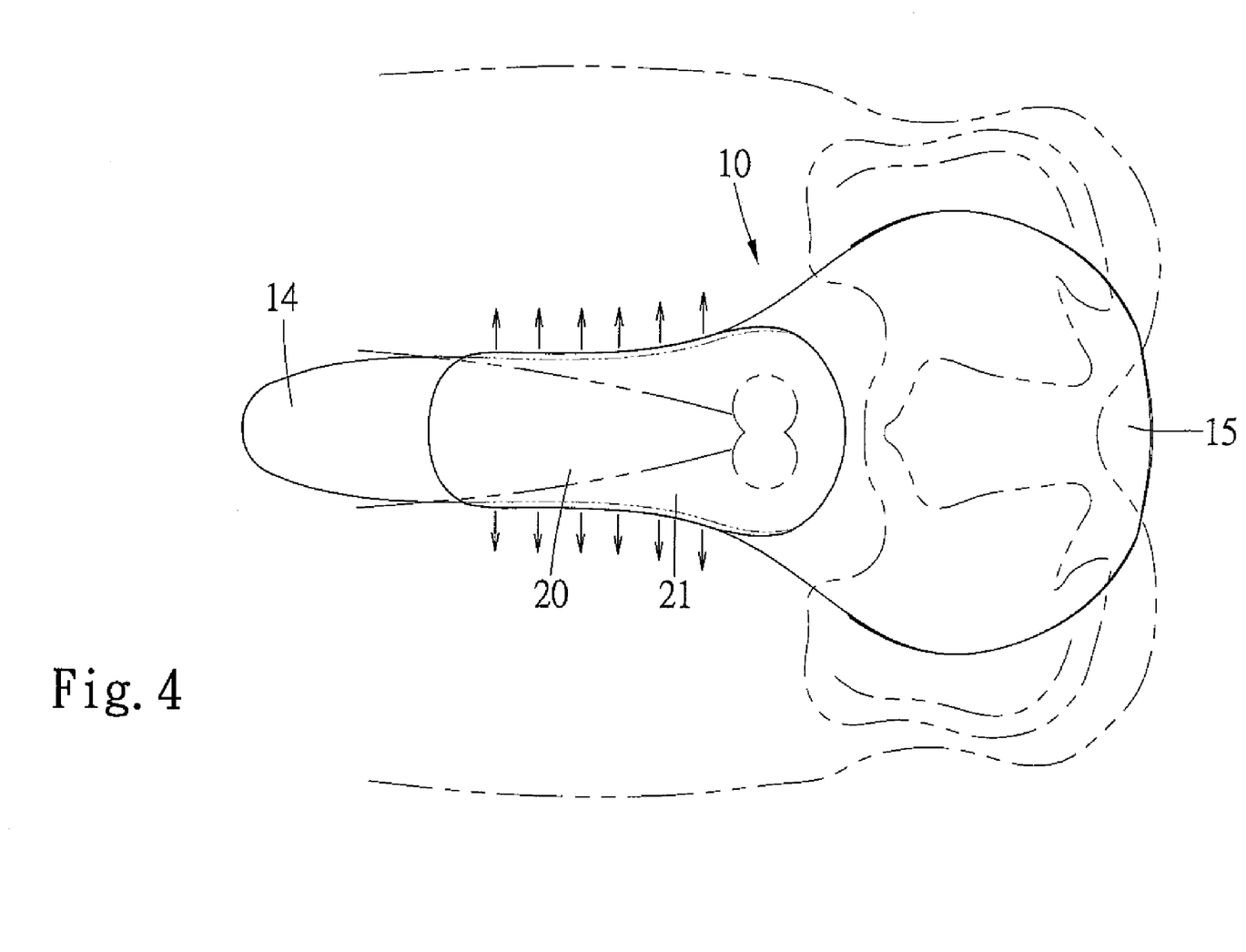
FIG. 4 is similar to FIG. 3, but with a rider's external genital bearing on the bicycle saddle, and with the external genital of the rider and the original shape of an elastic element shown in phantom.
Figure 6:
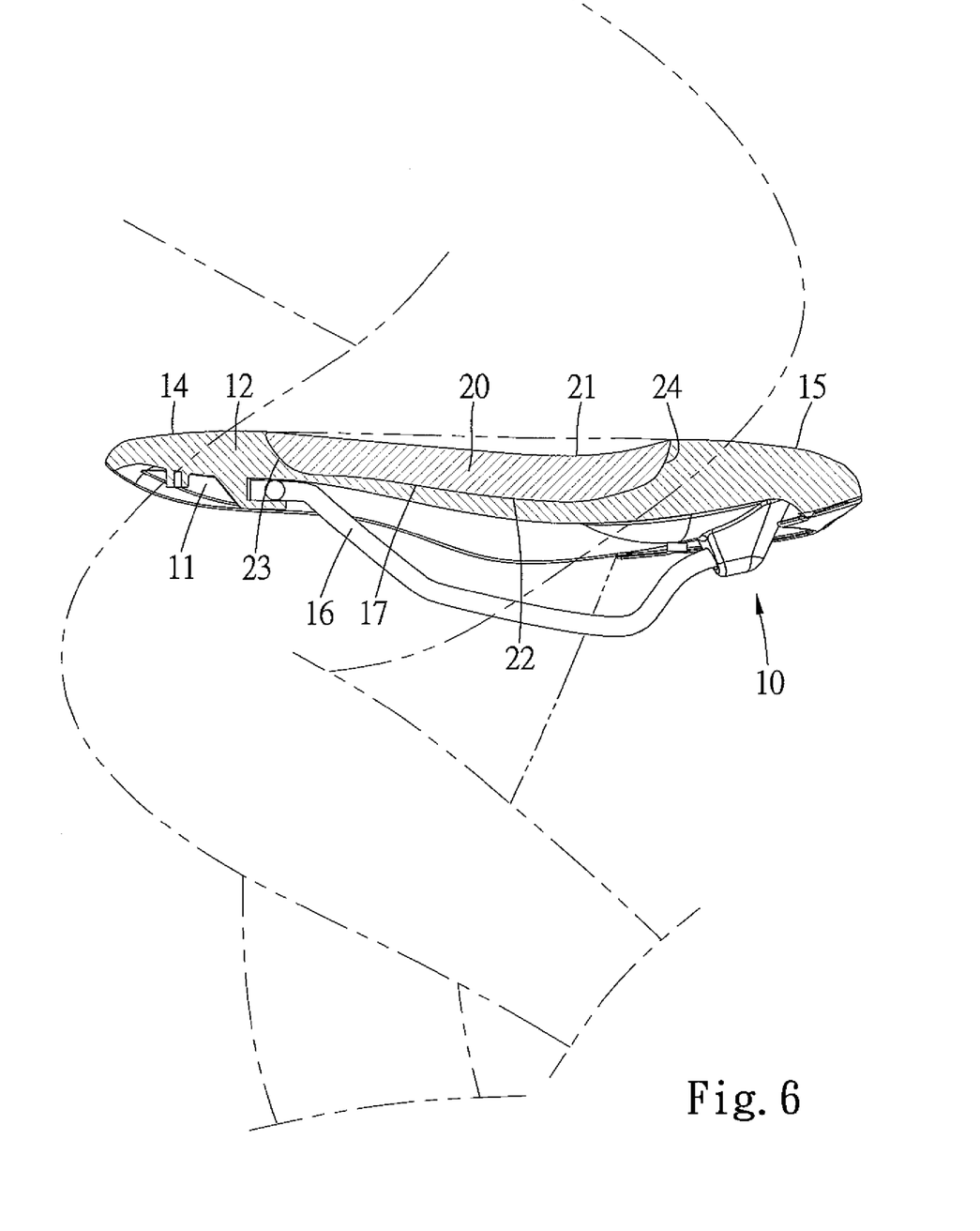
FIG. 6 is similar to FIG. 5, but with a rider bearing on the bicycle saddle and the elastic element in a sagged condition.

As best seen from FIGS. 4 and 6, if the rider sits on the bicycle saddle 10, the elastic element 20 will be in a sagged condition, and, its side edges 25 will extend transversely (in a direction as indicated by arrows) to the overall longitudinal direction of the bicycle saddle 10 and therefore extends beyond the side portions of the outermost perimeter of the recessed support surface 17.

Figure 7:
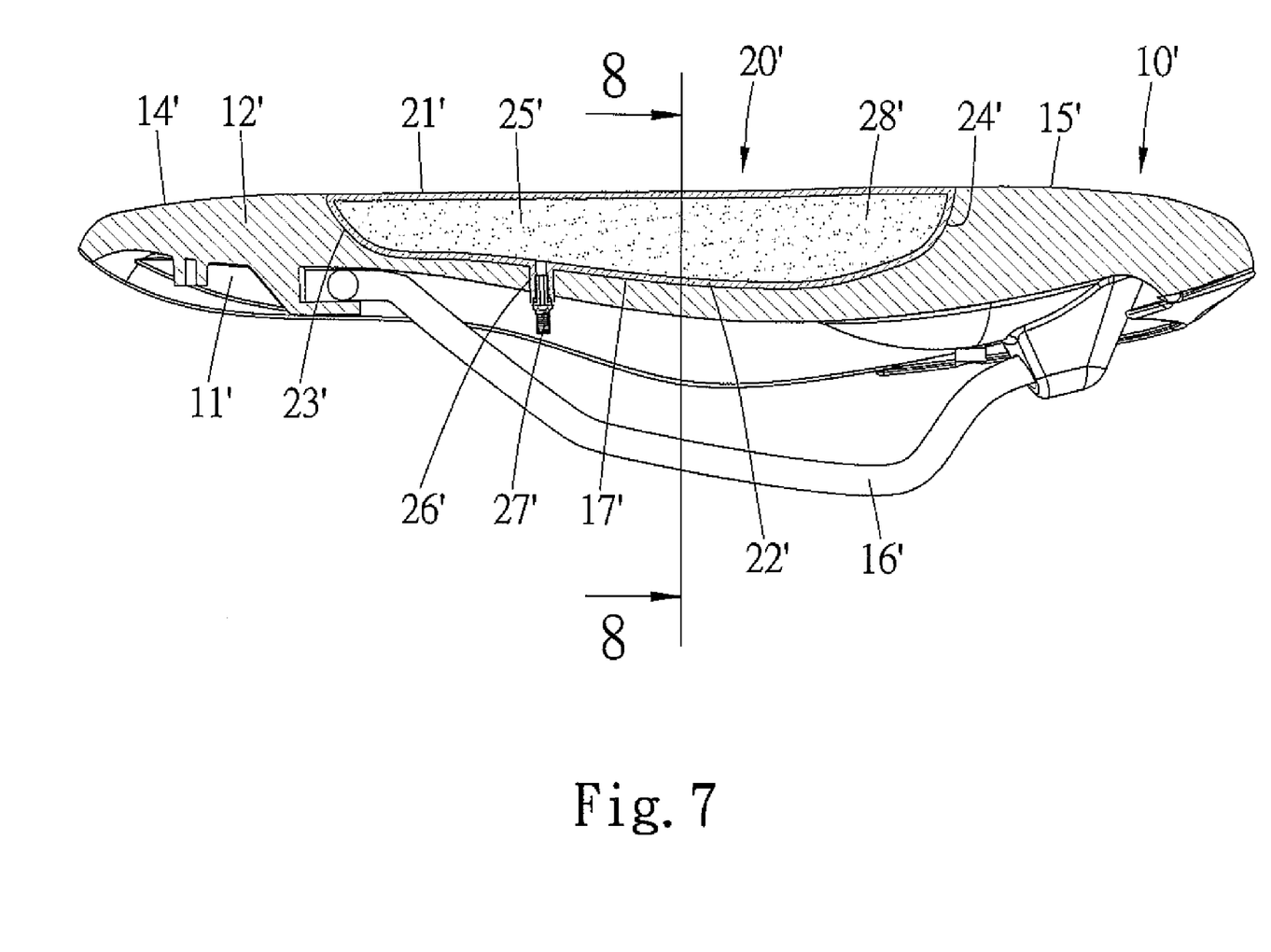
FIG. 7 is a side view of a second embodiment of the bicycle saddle in accordance with the present invention.
Figure 8:
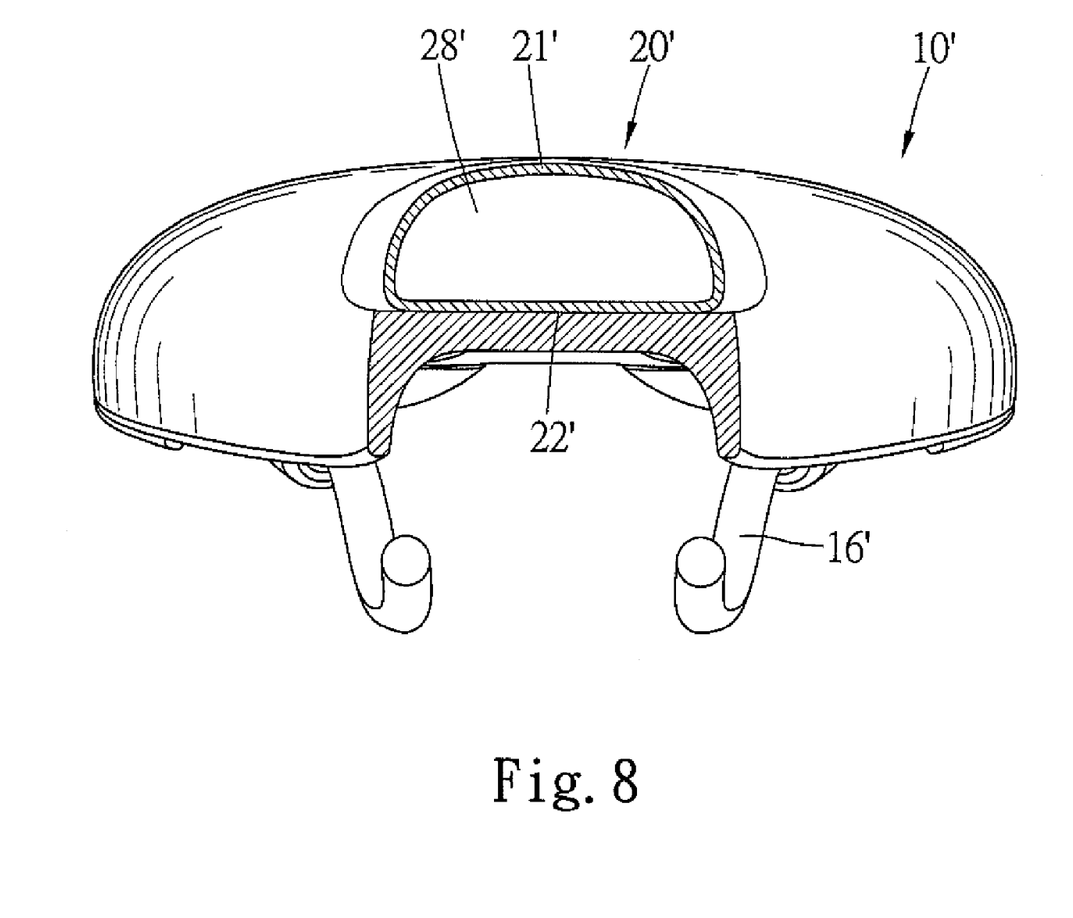
FIG. 8 is a cross sectional view taken along line 8-8 of FIG. 7.

FIGS. 7 and 8 show a second embodiment of the bicycle saddle 10' of the present invention, wherein like numerals are designated to denote like components of the first embodiment, but bearing a prime. The bicycle saddle 10' is differentiated from the first embodiment in that the elastic element 20' includes air 28' filled therein. The elastic element 20' further includes an air inlet mouth 26' adapted to receive a valve 27'. The valve 27' is connectable to a pumping apparatus (not shown), with the pumping apparatus capable of charging the air 28' into the elastic element 20' and discharging the air 28' outwardly of the elastic element 20'.

Figure 9:
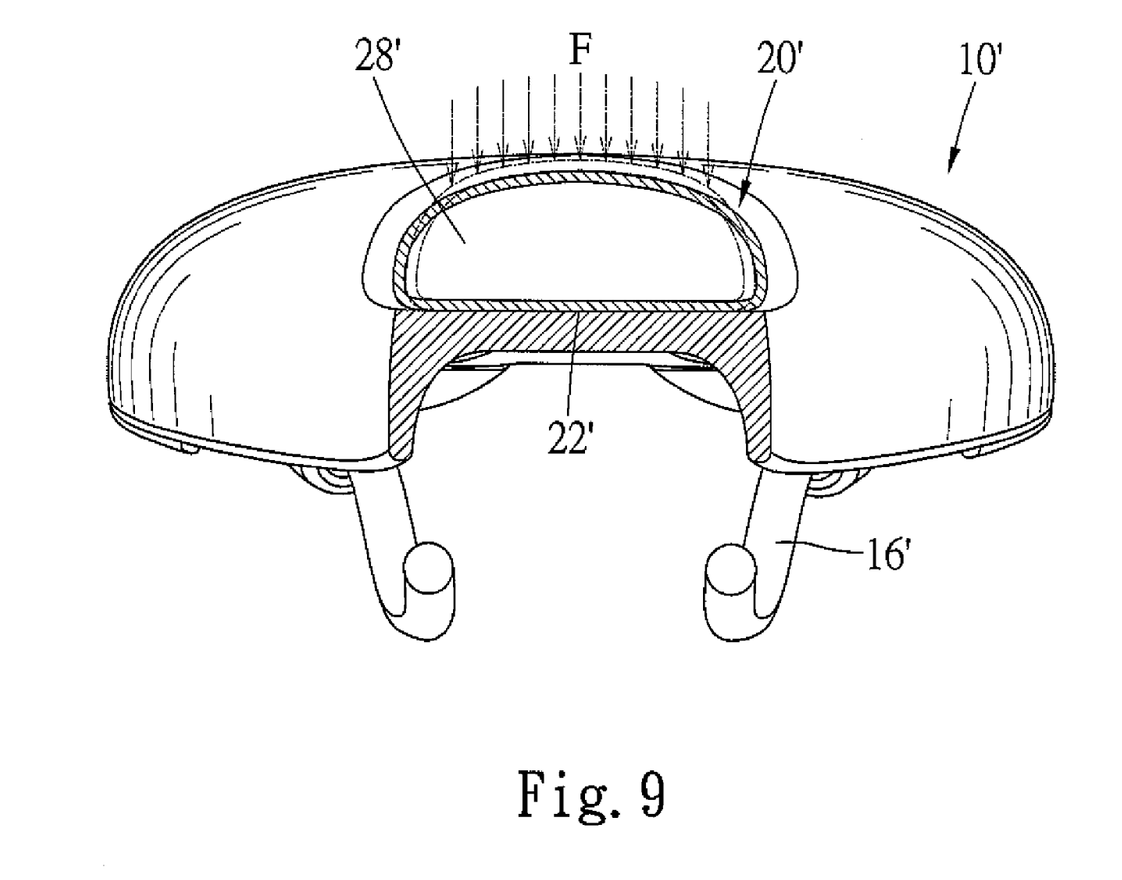
FIG. 9 shows forces (designated as F) are applied to the bicycle saddle in FIG. 8, with the original shape of an elastic element shown in phantom.

FIG. 9 shows when a plurality of evenly distributed forces (designated as F) are applied to the elastic element 20', the elastic element 20' will get sagged and extend transversely outwards beyond the outermost perimeter of the recessed support surface 17'.

Figure 10:
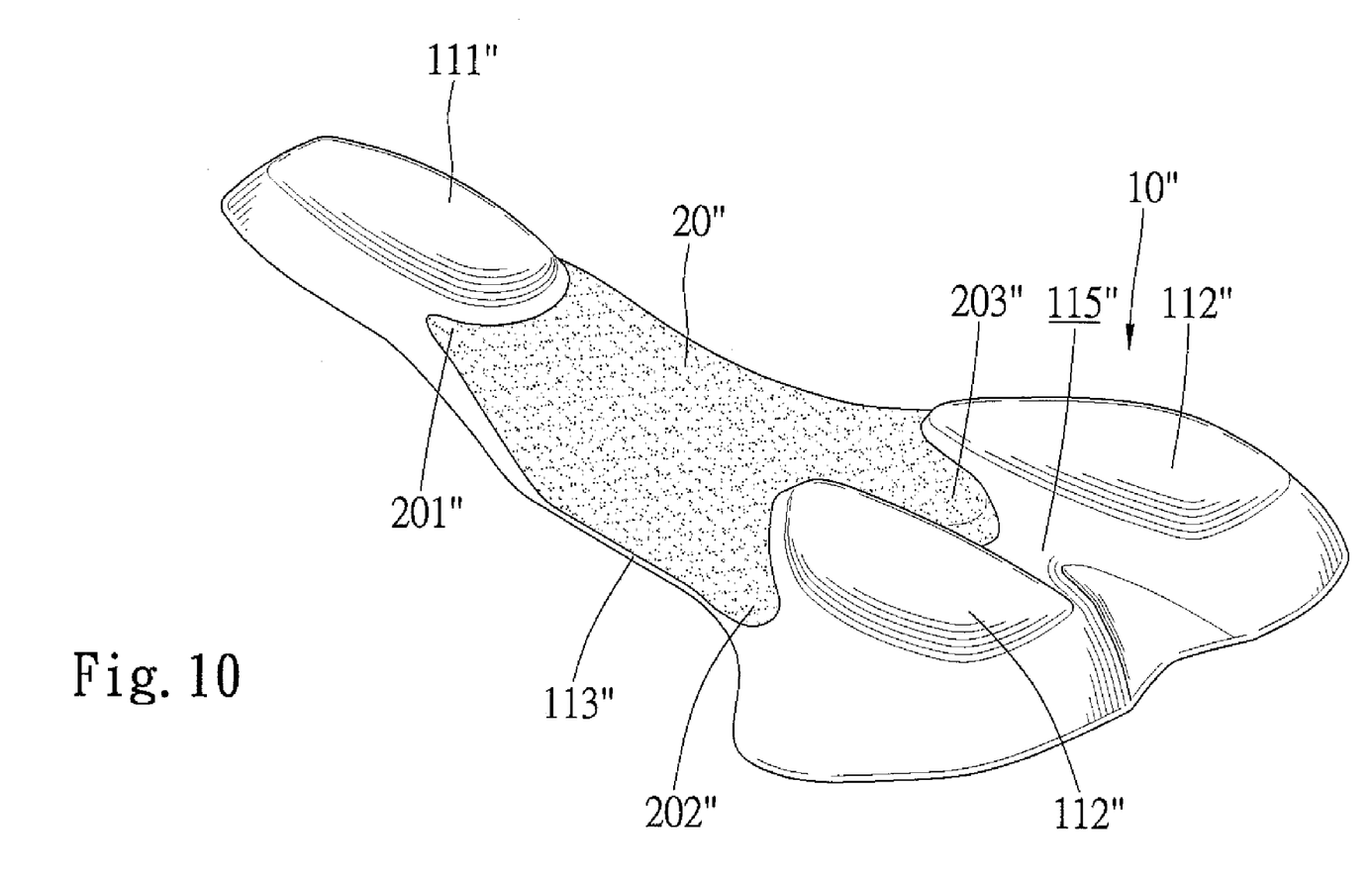
FIG. 10 is a perspective view of a third embodiment of the bicycle saddle in accordance with the present invention.
Figure 11:
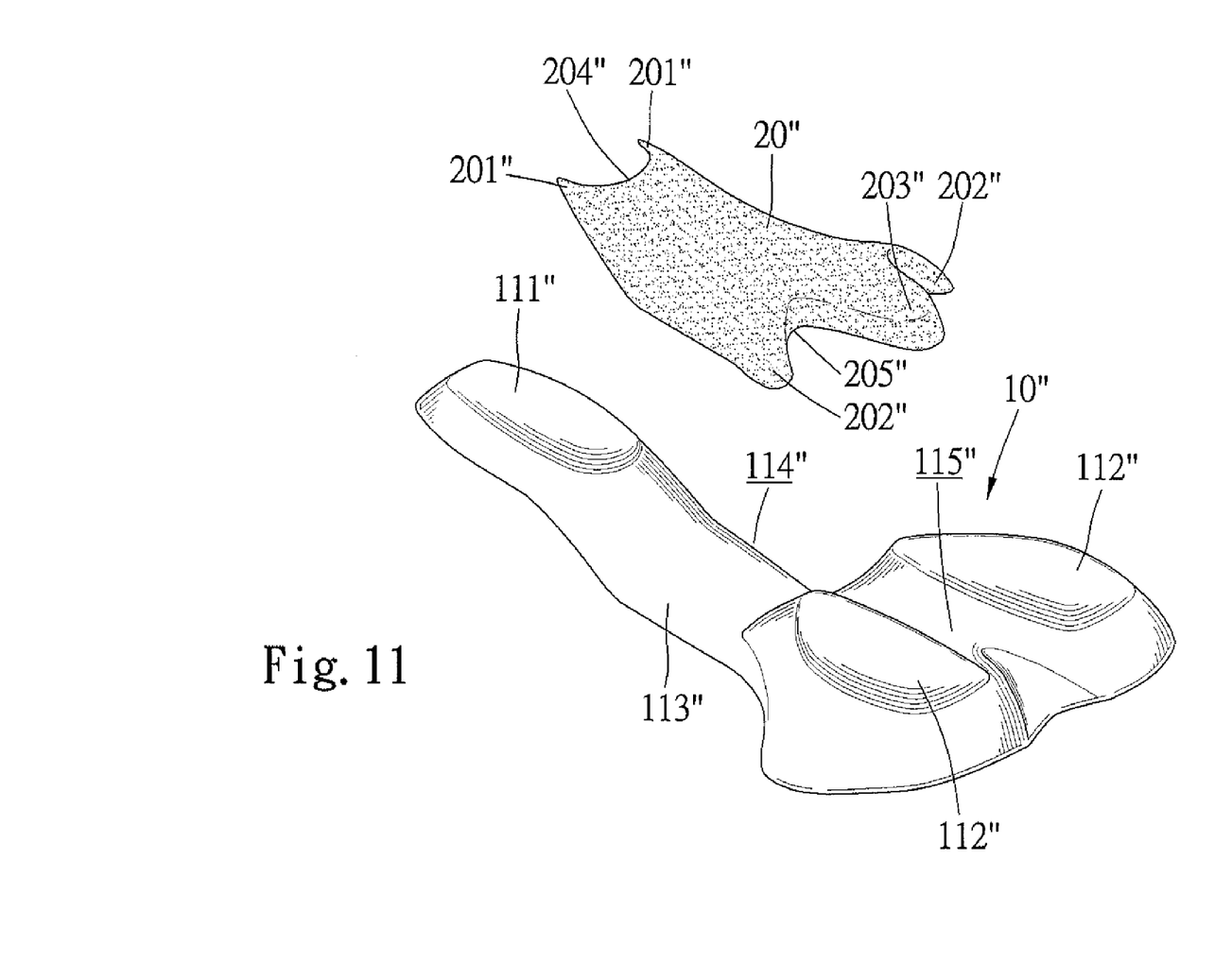
FIG. 11 is an exploded view of the bicycle saddle shown in FIG. 10.
Figure 12:
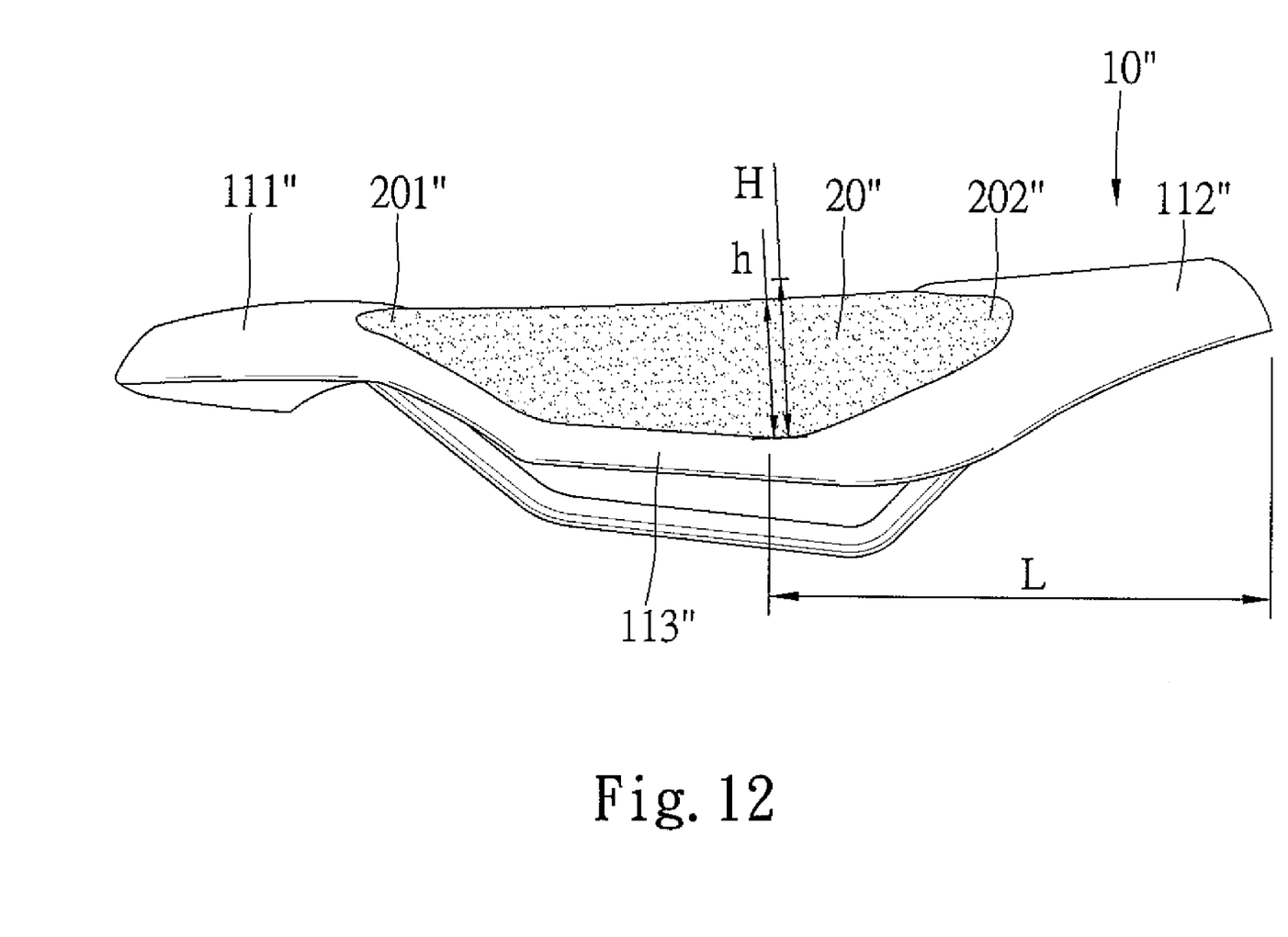
FIG. 12 is a side view of the bicycle saddle shown in FIG. 10.

FIGS. 10 to 12 show a third embodiment of the bicycle saddle 10" of the present invention, wherein like numerals are designated to denote like components of the first embodiment, but bearing a double prime. The bicycle saddle 10" is comprised of a frame 11" and an elastic element 20". The frame 11" includes a front pad 111", two rear pads 112" and a connective portion 113" for connecting the front pad 111" to the two rear pads 112". A space 114" is defined between the front pad 111" and the two rear pads 112" above the connective portion 113". A space 115" is defined between the rear pads 112".

The length L of the two rear pads 112" is no larger than 120 mm. In the preferred embodiment, the length L of the two rear pads 112" is 120 mm. The width T of the connective portion 113" is no larger than 50 mm. In the preferred embodiment, the width T of the connective portion 113" is 40 mm. The depth of the space 114", i.e., the distance from a plane defined by the pads 111" and 112" to the top of the connective portion 113", is marked with "H." The depth H of the space 114" is no larger than 30 mm. In the preferred embodiment the depth H of the space 114" is 30 mm.

The elastic element 20" is installed on the connective portion 113" in the space 114". The elastic element 20" can support external genitals of a rider without excessively pressing the same. The elastic element 20" is softer than the front pad 111" and the two rear pads 112" of the frame 11". The elastic element 20" can be attached to the frame 11" by adhesion, gluing, injection molding or in any other proper manner. The elastic element 20" includes two portions 201" extending beside the outer side of the perimeter of the front pad 111" and a front concave edge 204" for receiving the front pad 1ll". The elastic element 20" further includes two portions 202" extending beside the outer side of the perimeter of the two rear pads 112" and two rear concave edges 205" for receiving the two rear pads 112" respectively. In addition, the elastic element 20" includes an extensive portion 203" between the rear concave edges 205". The extensive portion 203" of the elastic element 20" is located between the two rear pads 112" within the space 115". Thus, the bicycle saddle 10" is aesthetically pleasant, and the connection of the elastic element 20" to the frame 11" is firm. The extensive portion 203" of the elastic element 20" can adequately support riders without excessively pressing them.

The width t of the elastic element 20" is identical to the width T of the connective portion 113". The thickness h of the elastic element 20" is marginally smaller than the depth H of the space 114".

Figure 13:
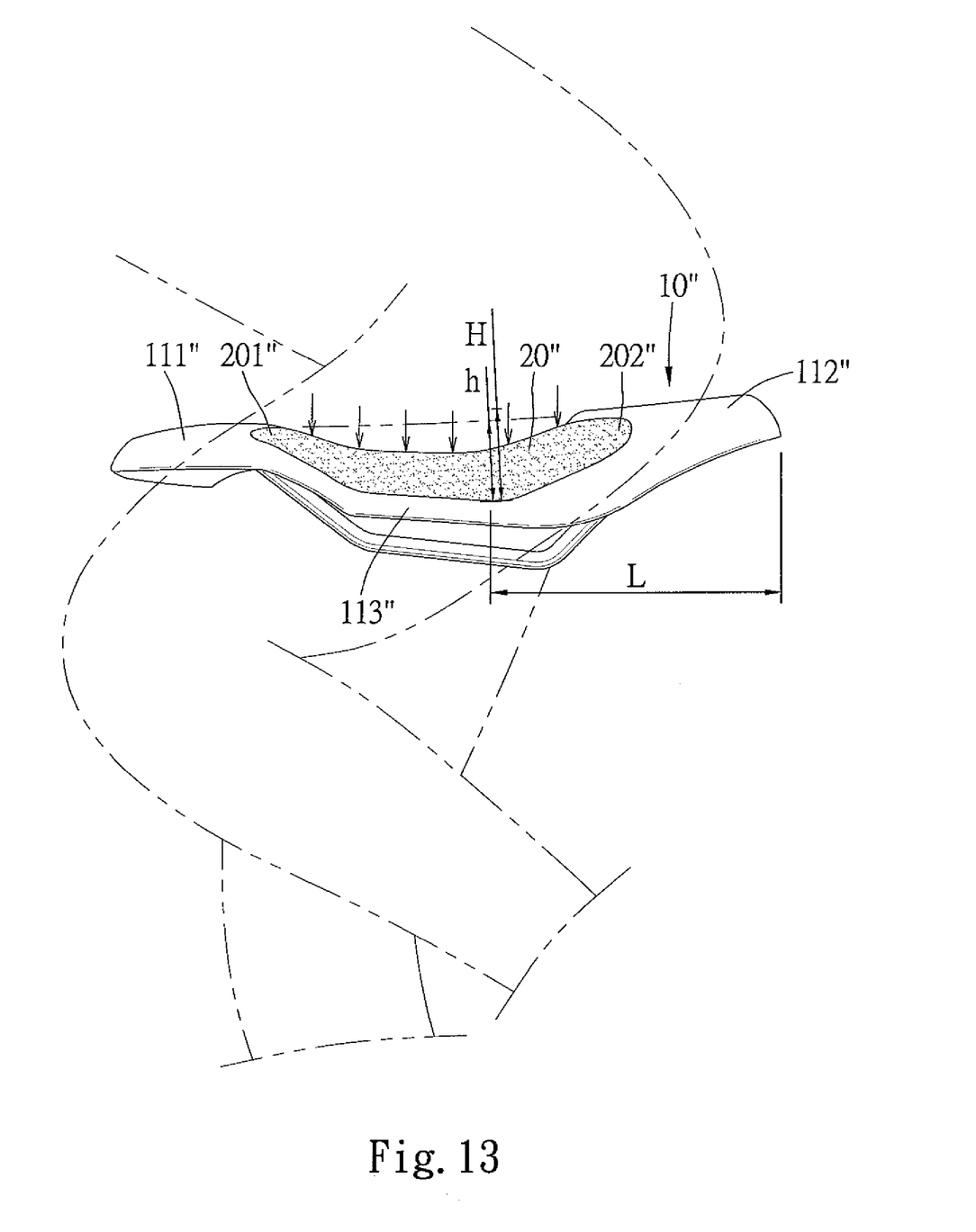
FIG. 13 is similar to FIG. 10, but with a rider bearing on the bicycle saddle and an elastic element of the bicycle saddle in a sagged condition.
Figure 14:
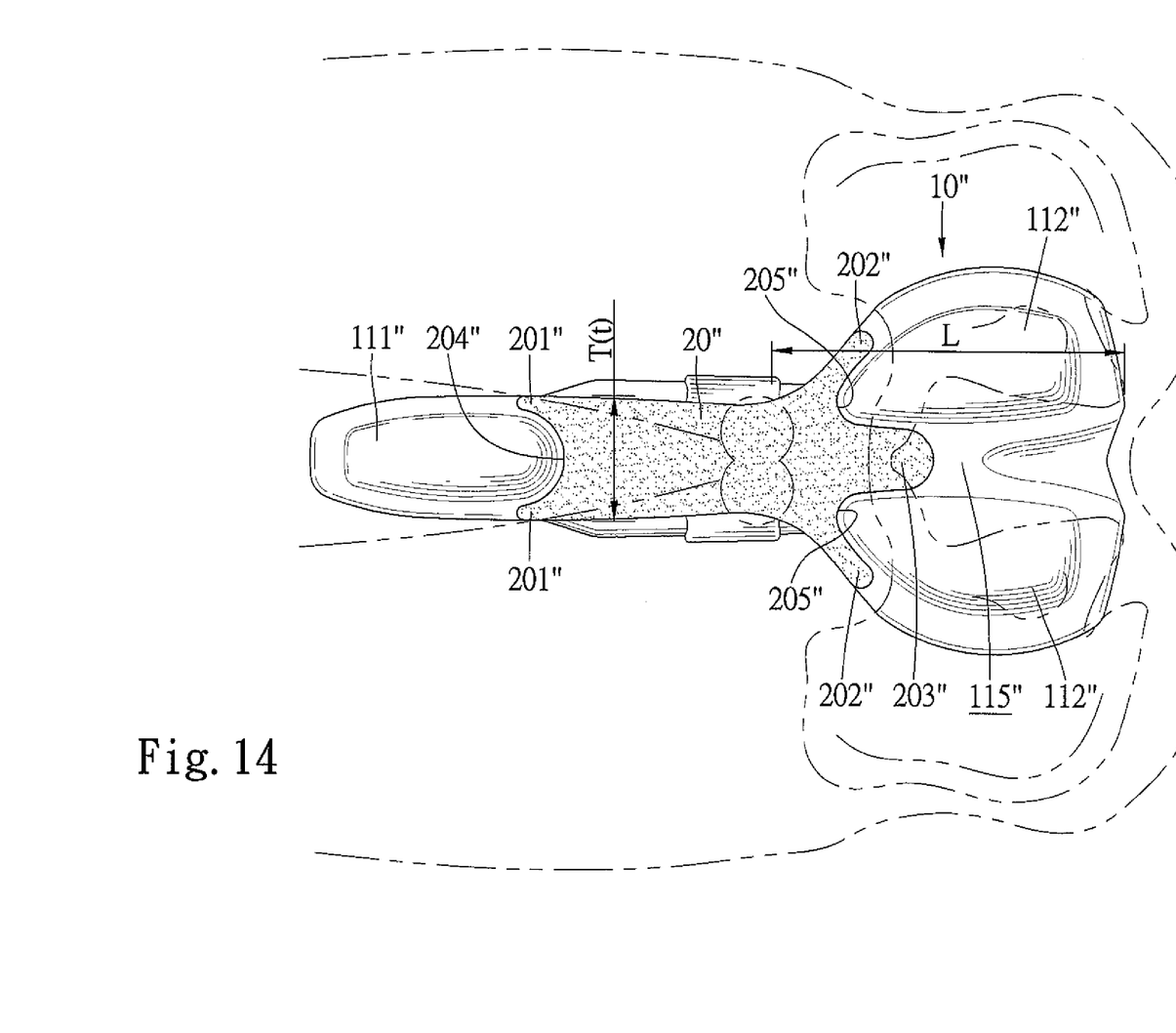
FIG. 14 is a top view of the bicycle saddle on which a rider's external genital bears, with the rider's external genital shown in phantom.

FIGS. 13 and 14 show a rider bearing on the bicycle saddle 10". The rider's hips are supported on the two rear pads 112". The length L of the two rear pads 112" is no larger than 120 mm so that the rider's hips can be well supported and that the rider can feel comfortable.

While the rider is pedaling with legs, the rider's thighs are located beside the connective portion 113" and the elastic element 20". The width T of the connective portion 113" is identical to the width t of the elastic element 20" that is no larger than 50 mm so that the rider's thighs will not rub against the connective portion 113" and the elastic element 20". The slim profile of the saddle makes the saddle look advanced, modem and appealing to customers.

Moreover, the rider's external genitals are located on the elastic element 20" that is softer than the pads 111" and 112" of the frame 11". Hence, the external genitals can be supported without being excessively pressed so that the external genitals will not be hurt because of fierce vibration. The thickness h of the elastic element 20" is marginally smaller than the depth H of the space 114". However, the elastic element 20" is thick enough to buffer the external genitals.

Thus, in view of forgoing, it is therefore an advantage of the present invention to provide a bicycle saddle 10, 10', 10" which comfortably supports the external genitals of a rider It is another advantage of the present invention to provide a bicycle saddle that provides good aeration to the rider.

It is yet another advantage of the present invention to provide an elastic element 20, 20' adapted to extend beyond the outermost perimeter of the recessed support surface 17, 17' and thereby avoid inducing discomfort to the rider.

While the specific embodiments have been illustrated and described, numerous modifications come to mind without significantly departing from the spirit of invention and the scope of invention is only limited by the scope of accompanying claims.

What is claimed is:

1. A bicycle saddle comprising:
   a frame extending in a longitudinal direction and a lateral direction perpendicular to the longitudinal direction;
   a padding placed over the frame and defining a sitting surface having a leading edge and a trailing edge spaced in the longitudinal direction from the leading edge, with the sitting surface further having a height in a vertical direction perpendicular to the longitudinal and lateral directions, said padding further including a recessed supporting surface extending in the longitudinal direction between the leading and trailing edges and having a depth from said sitting surface, with the recessed supporting surface being bounded only in the longitudinal direction by the leading and trailing edges of the sitting surfaces and being open to sides of the recessed supporting surface in the lateral direction; and
   an elastic element received in said recessed supporting surface, with the elastic element including a first surface defining a portion of the sitting surface and a second surface received in the recessed support surface, with the portion of said sitting surface including a leading edge portion receiving the leading edge of said padding, a trailing edge portion receiving the trailing edge of said padding and two side edges extending longitudinally between the leading and trailing edge portions, with the two side edges extending in the lateral direction from and exposed from the sides of the recessed supporting surface, with a height of the first surface of the elastic element from the recessed supporting surface being equal to or less than the depth of the recessed supporting surface; and
   wherein said elastic element sags and extends in the lateral direction out of the sides of the recessed supporting surface when subject to a force of weight transmitted from a rider.

2. The bicycle saddle as claimed in claim 1, wherein said elastic element is made of resilient material separate from and softer than said padding, allowing more cushioning effect to be provided.

3. The bicycle saddle as claimed in claim 1, wherein said elastic element is made separate from said padding, wherein said elastic element comprises an air inlet mouth adapted to receive a valve, with said valve being connectable to a pumping device, whereby air is charged into/discharged out of said elastic element.

4. A bicycle saddle comprising:
  a frame comprising a front pad, a first rear pad, a second rear pad and a connective portion for connecting the front pad to the rear pads so that a space is defined between the front pad and the rear pads, wherein the rear pads each has a perimeter, wherein each of the perimeters has an outer side and an inner side, with the inner sides of the perimeters of the first and second rear pads facing each other; and
  an elastic element installed on the connective portion in the space for supporting external genitals of a rider without excessively pressing the same, wherein the elastic element has a first portion and a second portion with the first portion extending beside the outer side of the perimeter of the first rear pad and the second portion extending beside the outer side of the perimeter on the second rear pad.

5. The bicycle saddle comprising: according to claim 4 wherein the length of the rear pads is no larger than 120 mm.

6. The bicycle saddle according to claim 4 wherein the width of the connective portion is no larger than 50 mm.

7. The bicycle saddle according to claim 4 wherein the width of the elastic element is identical to that of the connective portion.

8. The bicycle saddle according to claim 4 wherein the depth of the space is no larger than 30 mm.

9. The bicycle saddle according to claim 4 wherein the thickness of the elastic element is marginally smaller than the depth of the space.

10. The bicycle saddle according to claim 4 wherein the elastic element is softer than the frame.

11. The bicycle saddle according to claim 4 wherein the frame comprises a separation between the rear pads.

12. The bicycle saddle according to claim 11 wherein the space between the front pad and the rear pads and the separation between the rear pads are contiguous.

13. The bicycle saddle according to claim 11 wherein the rear pads further comprise a perimeter having a first area located on a first outer edge of the rear pad and a second area located on a second outer edge of the rear pad with the first and second areas contiguous with the space between the front pad and the rear pads and the separation between the rear pads.

14. The bicycle saddle according to claim 4 wherein the elastic element extends between the inner sides of the rear pads.

15. A bicycle saddle comprising:
  a frame comprising a front pad, two rear pads and a connective portion for connecting the front pad to the rear pads so that a space is defined between the front pad and the rear pads, with the space having a depth; and
  an elastic element installed on the connective portion in the space and having a height equal to or less than the depth of the space for supporting external genitals of a rider without excessively pressing the same, wherein said elastic element is made of resilient material separate from and softer than the front and two rear pads, allowing more cushioning effect, wherein the elastic element comprises a front concave edge receiving the front pad.

16. A bicycle saddle comprising:
  a frame comprising a front pad, two rear pads and a connective portion for connecting the front pad to the rear pads so that a space is defined between the front pad and the rear pads, with the space having a depth; and
  an elastic element installed on the connective portion in the space and having a height equal to or less than the depth of the space for supporting external genitals of a rider without excessively pressing the same, wherein said elastic element is made of resilient material separate from and softer than the front and two rear pads, allowing more cushioning effect, wherein the elastic element comprises two rear concave edges receiving the rear pads.

17. The bicycle saddle according to claim 16 wherein the elastic element comprises an extensive portion formed between the rear concave edges so that the extensive portion of the elastic element is located in a space between the rear pads.

18. A bicycle saddle comprising:
  a frame comprising a front pad, two rear pads and a connective portion for connecting the front pad to the rear pads wherein a first space is defined between the front pad and the rear pads and a second space is defined between the rear pads, with the first and second spaces having a depth; and
  an elastic element installed on the connective portion in the first and second spaces and having a height equal to or less than the depth of the first and second spaces for supporting external genitals of a rider without excessively pressing the same, wherein said elastic element is made of resilient material separate from and softer than the front and two rear pads, allowing more cushioning effect, wherein the elastic element comprises two rear concave edges receiving the rear pads and an extensive portion between the rear concave edges so that the extensive portion of the elastic element is located in the second space between the rear pads.

19. A bicycle saddle comprising:
  a frame comprising a front pad, two rear pads and a connective portion for connecting the front pad to the rear pads with a space defined between the front pad and the rear pads with a separation being defined between the rear pads, with the space having a depth,
  wherein the rear pads have a first elevation and the separation has a second elevation with the second elevation lower than the first elevation; and
  an elastic element installed on the connective portion in the space and having a height equal to or less than the depth of the space for supporting external genitals of a rider without excessively pressing the same,
  wherein said elastic element is made of resilient material separate from and softer than the front and two rear pads, allowing more cushioning effect,
  wherein the elastic element extends to the separation between the rear pads and includes an extensive portion located in the separation between the rear pads.

20. The bicycle saddle according to claim 19 wherein the space between the front pad and the rear pads and the separation between the rear pads are contiguous.

21. The bicycle saddle according to claim 20 wherein the two rear pads further comprise a perimeter having a first area located on a first outer edge of the rear pad and a second area located on a second outer edge of the rear pad with the first and second areas contiguous with the space between the front pad and the rear pads and the separation between the rear pads.

* * * * *